March 9, 1926.
L. R. SPENCER
PISTON RING
Filed May 28, 1925
1,576,377
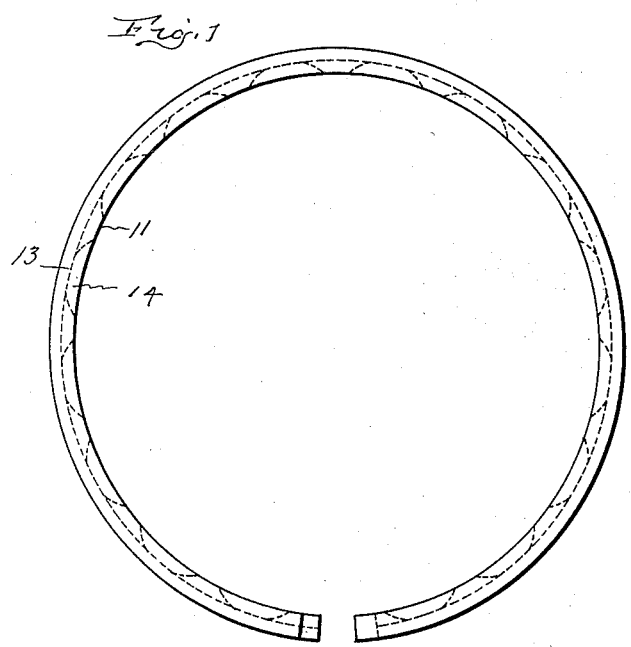
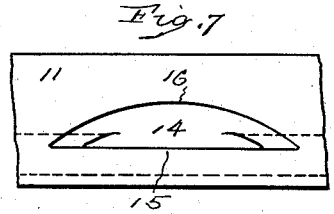
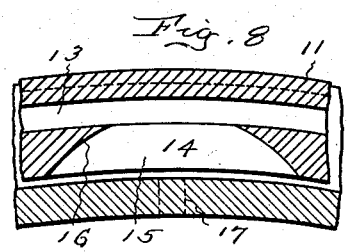
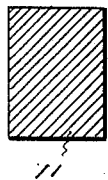 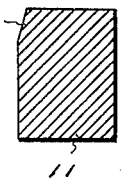 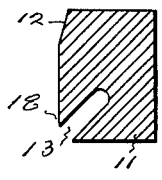 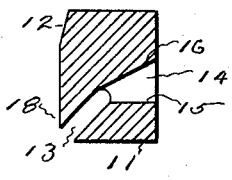
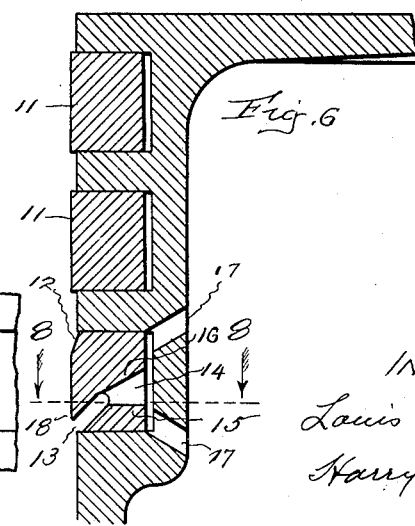
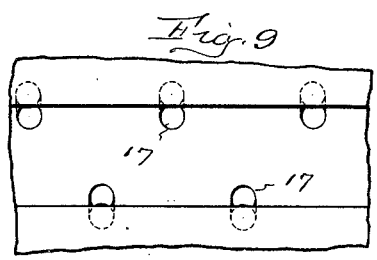
INVENTOR
Louis R. Spencer
by
Harry R. Williams
Atty.

Patented Mar. 9, 1926.

1,576,377

UNITED STATES PATENT OFFICE.

LOUIS R. SPENCER, OF WEST HARTFORD, CONNECTICUT.

PISTON RING.

Application filed May 28, 1925. Serial No. 33,368.

*To all whom it may concern:*

Be it known that I, LOUIS R. SPENCER, a citizen of the United States, residing at West Hartford, in the county of Hartford and State of Connecticut, have invented a new and useful Improvement in Piston Rings, of which the following is a specification.

The piston rings of internal combustion engines must be more or less elastic, and they are commonly made of cast iron which is hard and wear-resisting, but is brittle and rather easily broken. One or more of the rings of a piston are desirably made so as to remove excess oil from the cylinder wall and prevent it from passing to the top of the piston where it will burn and foul the cylinder and spark plugs. Piston rings have previously been grooved, have been notched, and have been slotted, in order to provide for the collection of excess oil and its return through the piston and crank case, but in such prior rings the cuts for this purpose have been so made that the rings are materially weakened and free passage for the oil to the interior of the piston has not resulted.

The object of the present invention is to provide an elastic, hard and durable piston ring with an oil collecting groove and slots forming passages therefrom of such shape and arrangement that the ring is practically as strong as an uncut ring and excess oil is efficiently collected and freely returned to the interior of the piston and subsequently to the engine crank case.

In the accompanying drawings Fig. 1 shows a plan of a piston ring formed in accordance with this invention. Figs. 2, 3, 4 and 5, on larger scale, illustrate the steps taken in the production of this ring,—2 showing a section of a ring blank, 3 a section of the blank with the upper outer corner chamfered, 4 a section showing the oil gathering groove that encircles the ring, and 5 a section showing one of the slots that open through the ring to the groove. Fig. 6 is a section of a portion of a piston with a ring that is formed according to this invention. Fig. 7 is a view looking from the inside of the ring toward one of the slots. Fig. 8 is a section of the ring and piston on the plane indicated by the dotted line 8—8 on Fig. 6 looking in the direction indicated by the arrows. Fig. 9 is a view looking into the piston groove and showing the oil passages therefrom.

In the practice of this invention a blank ring 11 of hard iron is slightly chamfered by grinding on its outer face near the upper edge as shown at 12. A thin groove 13 is cut substantially diagonally upward from the lower outer corner entirely around the ring. Slots 14 are milled with a conical cutter from the inside of the ring to the top of the encircling groove. Such a tool cuts away conical segments of the metal of the ring leaving the lower walls 15 of the slots flat and in a plane substantially at right angles to the vertical faces of the ring, and the upper walls 16, more or less dome-shaped, and sloping upward in practically a continuation of the upper wall of the groove. Slots formed in this manner are considerably higher and longer at the inner wall of the ring than where they merge into the groove.

Passages 17 are drilled on an incline through the piston wall to the upper and lower corners of the groove containing the ring which embodies this invention. These passages may be staggered as illustrated in Fig. 9.

As a piston provided with a ring shaped as above described moves downward the sharp lower edge 18 of the outer wall of the groove around the ring rubs on the wall of the cylinder and gathers all excess oil into the groove. From the groove this oil is passed through the slots, which form a continuation of the groove, to the space in the piston groove back of the ring, and from this space the oil is projected through the perforations into the interior of the piston from whence it drops to the crank case. As the piston stops at the end of its downward movement inertia tends to project the oil through the lower perforations, and as the piston stops at the end of its upward movement inertia throws the oil out through the upper perforations in the piston. The cuts for the slots are simple to make and when made in the manner described and of the shape illustrated they afford free passage for the oil from the groove, and as the slots gradually increase in height and width from the groove toward the center, the metal is left in such a shape that there are no definite corners or lines of weakness which are liable to crack and break under strains caused by the expansion or constriction of the ring.

The invention claimed is:—

A piston ring having a thin encircling groove with parallel walls extending from the outer lower corner of the ring obliquely upward and inward with relation to the outer vertical face of the ring, and slots extending from the inner face of the ring to the groove, said slots having the form of conical segments with flat lower walls and inclined upper walls that merge into the walls of the thin encircling groove.

LOUIS R. SPENCER.